United States Patent [19]
Jacobsen et al.

[11] Patent Number: 5,374,464
[45] Date of Patent: Dec. 20, 1994

[54] BULKHEAD VOID FILLER

[75] Inventors: Paul H. Jacobsen, Vernon Hills; Hugh J. Zentmyer, Green Oaks; Michael D. Loeschen, Lake Zurich, all of Ill.

[73] Assignee: Shippers Paper Products Co., Glenview, Ill.

[21] Appl. No.: 74,587

[22] Filed: Jun. 11, 1993

[51] Int. Cl.⁵ .......................... B32B 3/06; B32B 3/04; B32B 3/12
[52] U.S. Cl. .................................. 428/100; 428/101; 428/183; 428/184; 428/185; 428/186; 428/223; 410/140; 410/156
[58] Field of Search ................. 428/57, 101, 100, 223, 428/184, 185, 186, 183; 410/140, 156

[56] References Cited
U.S. PATENT DOCUMENTS 4,390,578  6/1983  Brooks ................................ 428/57
4,880,679  11/1989  Bonazza ............................. 428/57
5,132,156  7/1992  Trassare et al. .................... 428/116

FOREIGN PATENT DOCUMENTS 581381  10/1946  United Kingdom ................. 428/57

*Primary Examiner*—Alexander S. Thomas
*Attorney, Agent, or Firm*—Schwartz & Weinrieb

[57] ABSTRACT

The present invention discloses an inverted V-shaped bulkhead void filler having a novel non-pivotable, but disengagable, fastener for filling empty spaces in a cargo area during shipping. The bulkhead void filler has first and second rigid panels of a sandwich-type construction attached by the fastener at an upper end of each of the panels. To form the novel non-pivotable, but disengagable, fastener, the upper end of the second panel fits snugly against and is attached to a portion of a core of the first panel, and a portion of the first panel overlaps and is attached to the second panel.

22 Claims, 3 Drawing Sheets

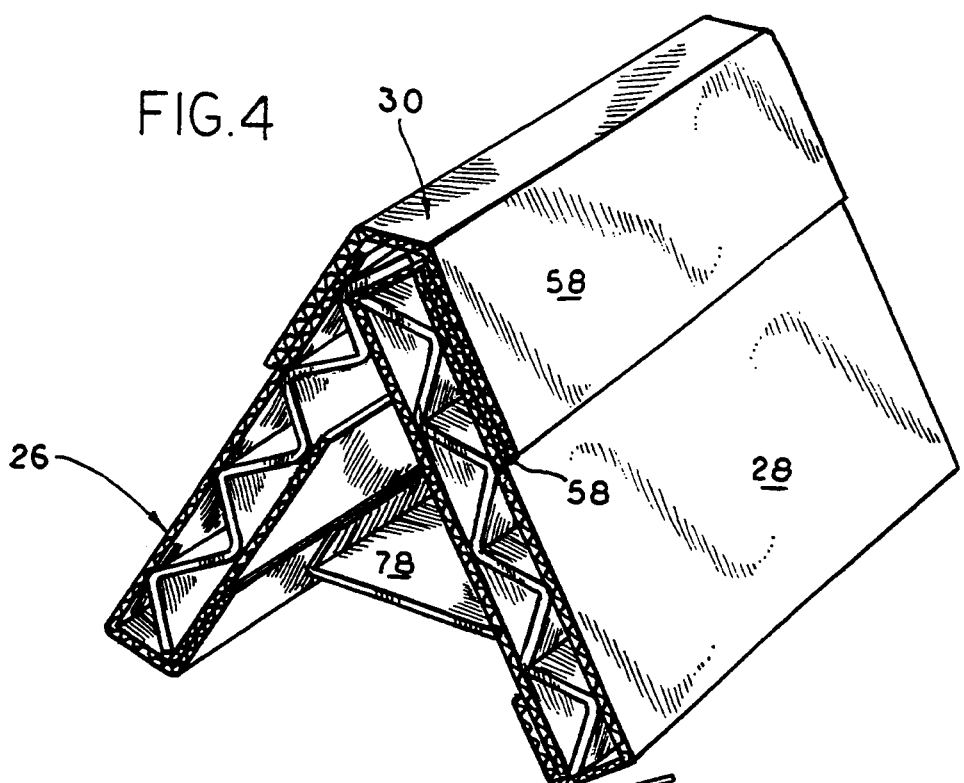
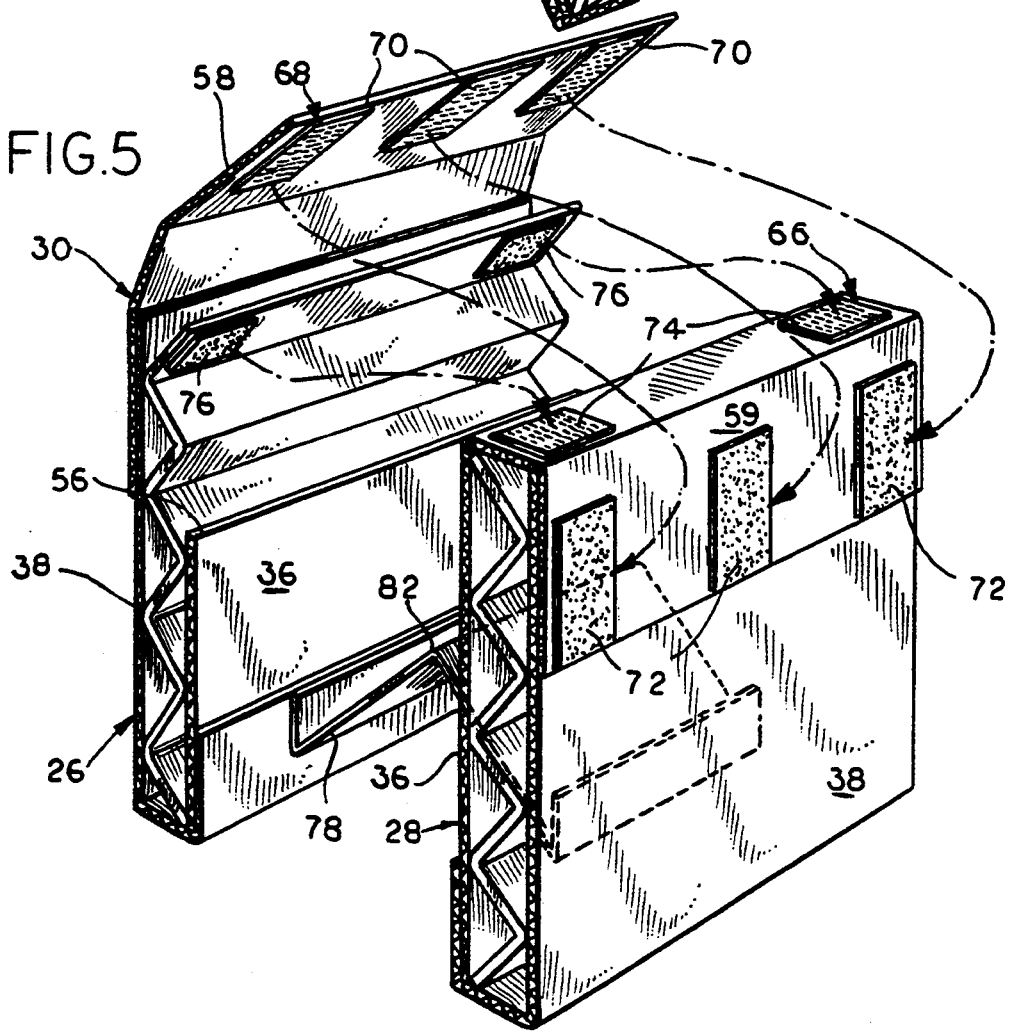

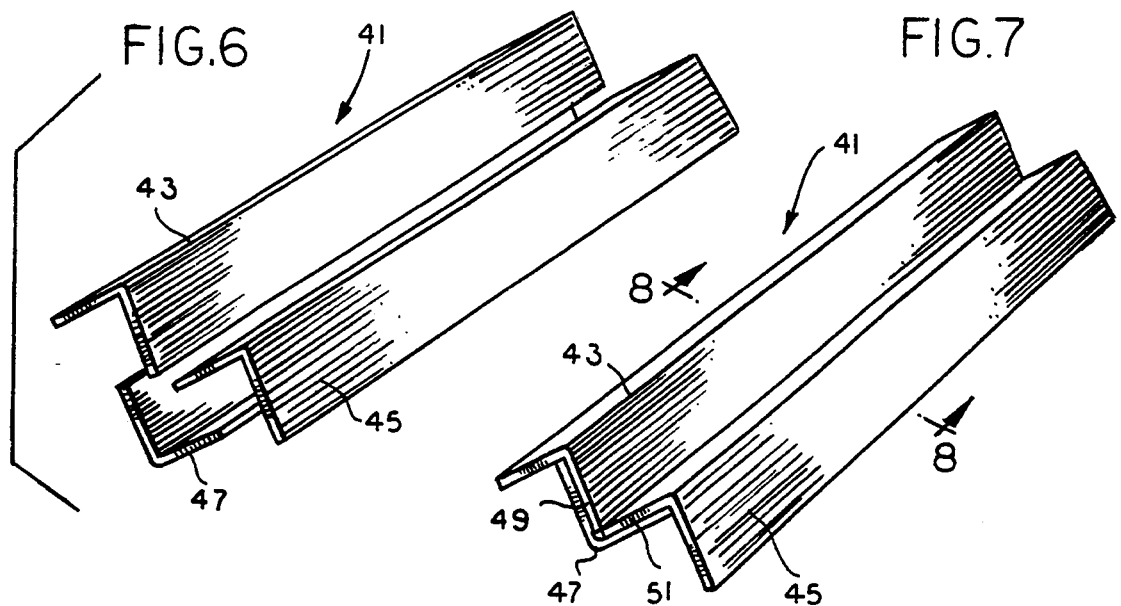
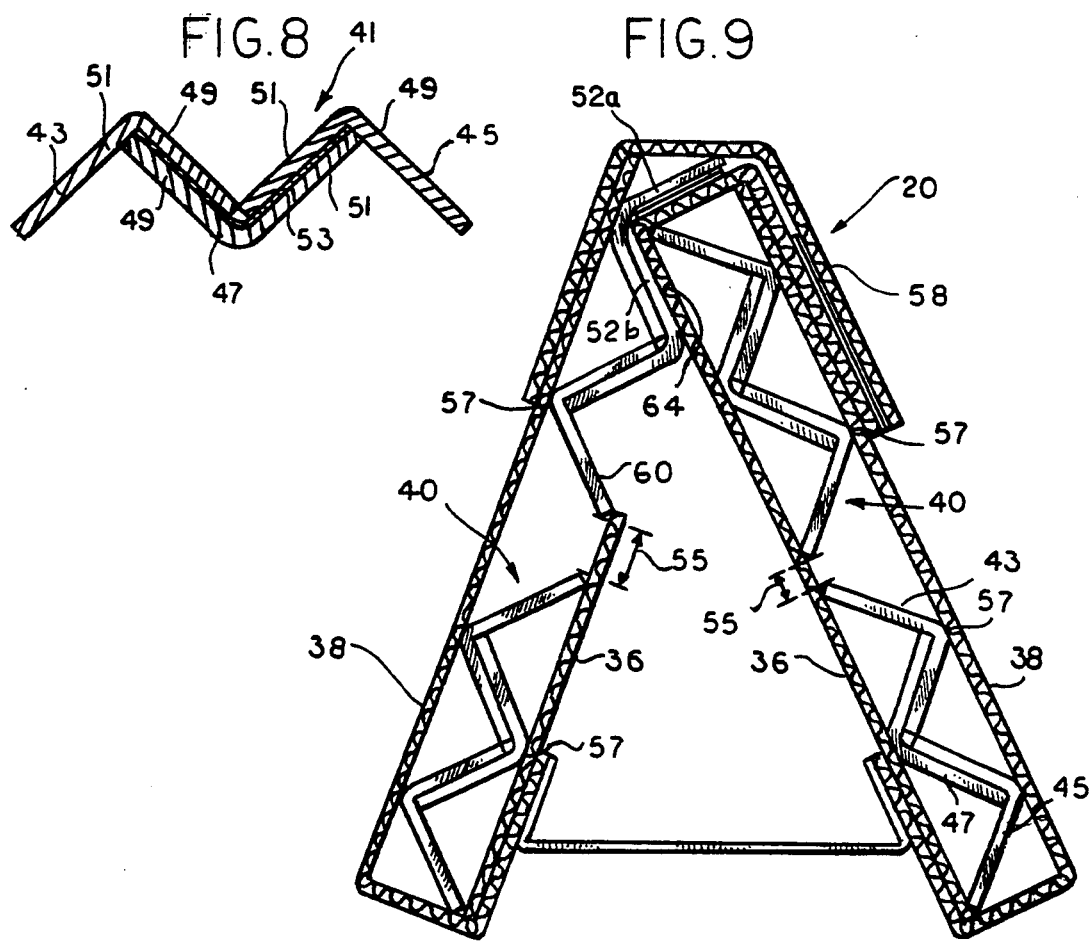

BULKHEAD VOID FILLER

FIELD OF THE INVENTION

This invention is generally directed to a light-weight bulkhead void filler for filling empty spaces in a cargo area to prevent cargo from shifting during transport. More particularly, the invention contemplates an inverted V-shaped void filler that, when assembled, is non-pivotable.

BACKGROUND OF THE INVENTION

The use of light-weight bulkhead void fillers is well-known in the art. For example, U.S. Pat. No. 5,132,156 presents an inverted V-shaped, light weight void filler that is comprised of two panels connected at their upper ends by a pivotable connection. The panels may be moved from a closed, side-by-side position to an open inverted V position by moving the bottom ends of the panels outwardly. The void filler relies on a limiter to prevent the panels from spreading too great of a distance and collapsing outwardly.

This type of void filler presents a serious disadvantage. If the load generated by the cargo during shipment is not distributed in a uniform manner on this prior art void filler, it has the tendency to collapse by pivoting to the closed, side-by-side configuration. Also, there exists the possibility that a piece of cargo may fall on the pivotable bulkhead void filler which could cause the filler to pivot to the closed position.

The present invention is intended to overcome or minimize all of these problems, as well as to present several other improvements.

OBJECTS OF THE INVENTION

A general object of the present invention is to provide a non-pivotable bulkhead void filler for use in cargo areas during shipping.

An object of the present invention is to provide a bulkhead void filler having a novel construction with two rigid panels and a fastener.

Another object of the present invention is to provide a bulkhead void filler having a novel core construction.

It is a further object of the present invention to provide a bulkhead void filler that has a non-pivotable, but disengagable, fastener between two rigid panels to form an inverted V-shaped bulkhead void filler.

It is a specific object of the present invention to provide a bulkhead void filler that is rigid and strong.

SUMMARY OF THE INVENTION

Briefly, and in accordance with the foregoing, the present invention discloses an inverted V-shaped bulkhead void filler having a novel non-pivotable, but disengagable, fastener for filling empty spaces in a cargo area during shipping. The bulkhead void filler has a first and second rigid panel of a sandwich-type construction attached by the fastener at an upper end of each of the panels. To form the novel non-pivotable, but disengagable, fastener, the upper end of the second panel fits snugly against and is attached to a portion of a core of the first panel, and a portion of the first panel overlaps and is attached to the second panel.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements and in which:

FIG. 4 is a perspective view of the bulkhead void filler of FIG. 3;

FIG. 5 is a perspective view of the bulkhead void filler in a disassembled condition;

FIG. 6 is a perspective view of an alternate embodiment of a portion of a core of the bulkhead void filler in a disassembled condition;

FIG. 7 is a perspective view of the portion of the core shown in FIG. 6 is the assembled condition;

FIG. 8 is an end view of the core of FIG. 7; and

FIG. 9 is an end view of the bulkhead void filler showing the core of FIG. 7.

DETAILED DESCRIPTION OF THE PREFERRED EMBODIMENT

Figure 1:
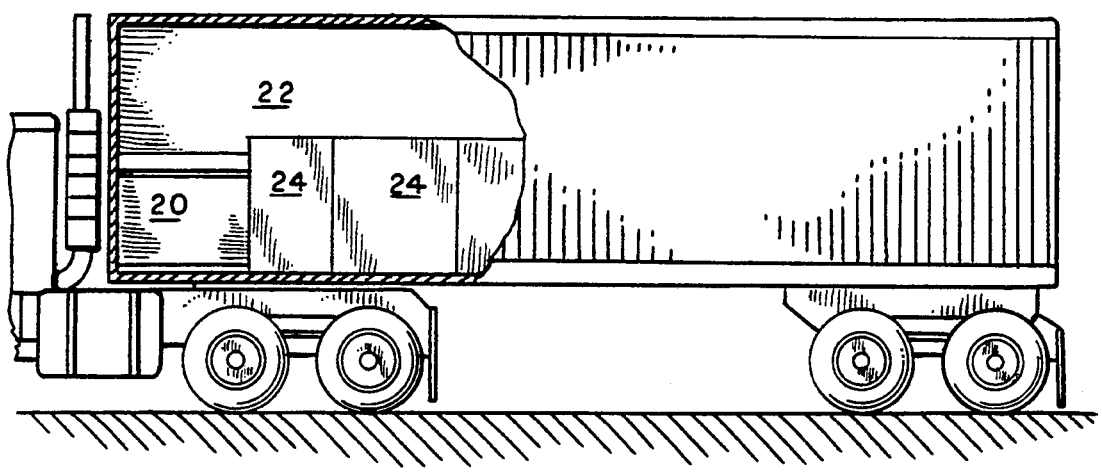
FIG. 1 is a side view of a trailer partially cut away, showing a bulkhead void filler and cargo according to the present invention.

While the invention may be susceptible to embodiment in different forms, there is shown in the drawings, and herein will be described in detail, a specific embodiment with the understanding that the present disclosure is to be considered an exemplification of the principles of the invention, and is not intended to necessarily limit the invention to that as illustrated and described herein.

As illustrated in FIG. 1, the bulkhead void filler 20 is used in a cargo bay or area 22 for filling empty spaces or areas in the cargo bay 22 during the shipment of cargo 24 to prevent the cargo 24 from shifting during transport. The bulkhead void filler 20 may be used in a variety of shipping means, such as a trailer as shown in FIG. 1, or, for example, a ship or airplane cargo bay.

Figure 2:
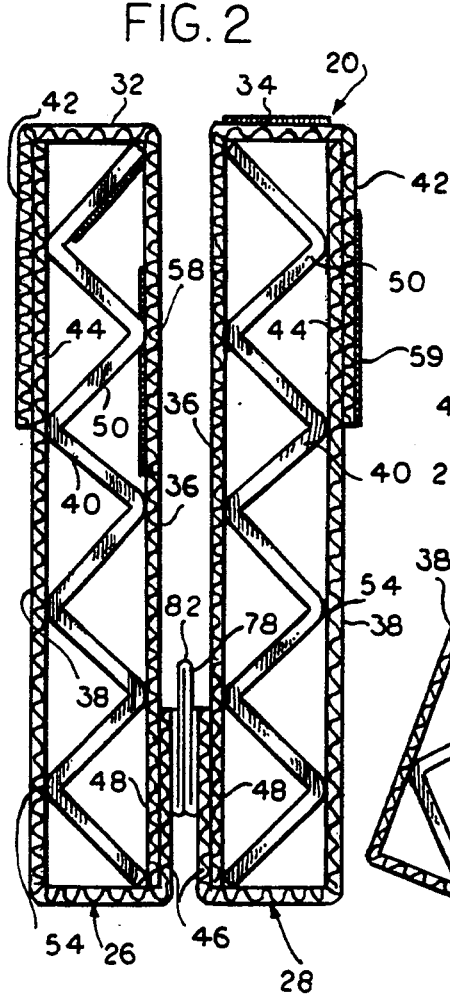
FIG. 2 is an end view of a bulkhead void filler in a disassembled condition according to the present invention.
Figure 3:
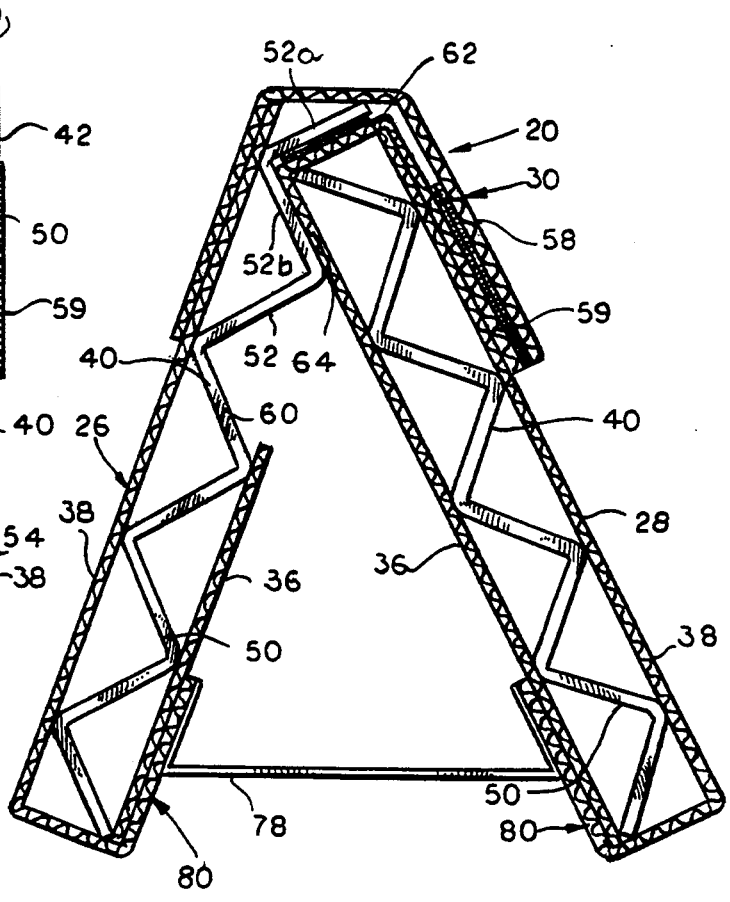
FIG. 3 is an end view of the bulkhead void filler of FIG. 2 in the assembled condition.

The bulkhead void filler 20 of the present invention is of a light-weight construction and is generally comprised of a first rigid panel 26 and a second rigid panel 28 that are non-pivotably, but disengagably, attached to each other by a fastener 30 at the upper ends 32, 34 of the rigid panels. The void filler 20 may take on one of many sizes, depending on the use. The first and second rigid panels 26, 28 are of substantially equal size and similar construction. When the rigid panels 26, 28 are not attached, as illustrated in FIG. 2, the panels 26, 28 lie in a generally flat, side-by-side configuration which allows for easy storage and shipment. When the rigid panels 26, 28 are attached by the non-pivotable fastener 30 as shown in FIGS. 3 and 4, the bulkhead void filler 20 generally takes the form of an inverted V.

In use, the bulkhead void filler 20 is placed between the cargo and the walls of the cargo area or bulkhead, or between separate pieces of cargo. The vertical edges of the void filler 20 abut the cargo 24 and/or wall and resist the forces created by the load of the cargo 24 during transport. Multiple bulkhead void fillers 20 may be placed in a side-by-side configuration to fill the empty areas in the cargo bay 22 if necessary.

Each separate rigid panel 26, 28 takes the form of a sandwich-type construction so as to increase the strength of the bulkhead void filler 20 so that the bulkhead void filler 20 will not collapse under the pressure of the cargo 24 during shipping. The sandwich-type construction is formed by a first, or inner, face sheet 36 and a second, or outer, face sheet 38 attached to each other by a core 40.

The construction of the rigid panels 26, 28 may take one of many forms. The rigid panels 26, 28 are substantially identical in construction except for the differences described herein. In the preferred embodiment, the core 40 is inserted between the face sheets 36, 38, a first end 42 of the inner face sheet 36 is overlapped and bonded to a second end 44 of the outer face sheet 38 a predetermined distance, and a first end 46 of the outer face sheet 38 is overlapped and bonded to a second end 48 of the inner face sheet 36 a predetermined distance. It is to be understood that other types of construction for creating the rigid panels 26, 28 are within the scope of the invention so long as the core 40 is generally surrounded by the face sheets 36, 38 as illustrated in the drawings. The face sheets 36, 38 are bonded to each other by suitable means, such as adhesive, and are made from a materials having high strength and rigidity, such as corrugated cardboard.

Each core 40 is made of a suitable material, such as an angle member of paper, plastic, composite, or other suitable material, and takes the form of a corrugated or zig-zag configuration in order to reinforce and strengthen the rigid panels 36, 38 so as to prevent the panels 26, 28 from collapsing. The core 40 may take one of many forms. In the first embodiment, as shown in FIGS. 2-5, the core 40 is made of at least one folded sheet 50 having a series of individual panels 52 of approximately equal length. However, it is to be understood that multiple folded sheets may be used. The individual panels 52 of the folded sheet 50 are angled at 45° to the face sheets 36,38 with a 90° angle between the individual panels 52. The folded sheet 50 is attached to the face sheets 36, 38 at substantially all of the fold lines or ridges 54 by suitable means such as a bonding adhesive.

In the second and preferred embodiment of the core 40, as shown in FIGS. 6-9, the core 40 includes multiple M-shaped braces 41. Each brace 41 is made up of two V-shaped sheets 43,45, preferably made of an angle member, laid side-by-side to create the M-shape. A connecting V-shaped sheet 47, preferably made of an angle member, overlaps a leg 49,51 of each V-shaped sheet 43,45, respectively, and attaches the two sheets 43,45 together. The connecting sheet 47 is bonded to sheets 43,45 by suitable means 53 such as adhesive. The legs 49,51 of the sheets 43,45,47 are angled at approximately 45° to the face sheets 36,38 with a 90° angle between the legs 49, 51. At the portion where the connecting V-shaped sheet 47 overlaps a leg 49,51 of the sheets 43,45, a double thickness is created which achieves additional strength with less weight while reducing the cost of manufacture since each piece 43,45 is not a double thickness. The M-shaped braces 41 may be spaced depending on the strength needed in the particular application. The space 55 can vary from one half of an inch up to twenty inches. This flexibility allows the M-brace 41 to be used in a variety of applications. The M-shaped braces 41 are attached to the face sheets 36,38 at substantially all of the fold lines or ridges 57 by suitable means such as a bonding adhesive.

The novel fastener 30 of the present invention allows the rigid panels 26, 28 to be attached in a non-pivotable configuration, while also allowing the rigid panels 26, 28 to be detached from each other for easier storage as described hereinabove. The non-pivotable configuration of the fastener 30 will not allow the bulkhead void filler 20 to collapse or pivot to a closed position under pressure which overcomes a disadvantage presented by prior art pivotable bulk head void fillers.

To form the fastener 30, the inside face sheet 36 of the first panel 26 is cut along a horizontal line 56 at a predetermined distance from the upper end 32 of the first panel 26 in order to form a flap or panel section 58. The flap 58 is not attached to the core 40 and is free moving since the upper portion of the inner face sheet 36 is not bonded to the corrugated core 40. The flap 58 must be of a sufficient length to securely hold the second rigid panel 28 against the first panel 26 as will be described in detail herein.

When the first panel 26 is cut to create the flap 58, a portion 60 of the upper end of the corrugated core 40 is exposed. To attach the rigid panels 26, 28 together, the upper end 34 of the second rigid panel 28 is placed in an abutting relationship with the two uppermost exposed individual panels 52a, 52b of the core 40 of the first rigid panel 26 and attached thereto by suitable attaching means 66. Thus, the upper-most panel 52a abuts the top 62 of the second rigid panel 28 and the second uppermost panel 52b abuts a portion of the side 64 of the second panel 28. Since the individual panels 52 or legs 49, 51 of the core 40 are angled at approximately 45° to the face sheets 36, 38, with a 90° angle between the individual panels 52 or legs 49, 51 as described hereinabove, the upper end 34 of the second panel 28 fits snugly against the core 40. The flap or panel section 58 is folded over the upper end 34 of the second panel 28 and mates with a panel section 59 of the second panel 28. The panel sections 58, 59 are attached by suitable attaching means 68, preferably releasable, to complete the fastener 30. When the fastener 30 is completed, the rigid panels 26, 28 are at approximately a 45° angle to each other and cannot pivot in relation to each other. The panels 26, 28 cannot move relatively inwardly since the second panel 28 fits snugly against the core 40 which prevents motion in the inward direction. The panels 26, 28 cannot move outwardly since the flap 58, when folded over and attached to the second panel 28, prevents motion in the outward direction.

In the preferred embodiment, the flap 58 is attached to the outer face sheet 38 of the second panel 28 by using VELCRO patches 70 on the flap 58 with complementary VELCRO patches 72 on the outer face sheet 38. In order to insure that the second rigid panel 28 will be held securely and non-pivotably against the first rigid panel 26 when the rigid panels 26, 28 are connected by the fastener 30, the top 62 of the second panel 28 is attached to the upper-most individual panel 52a of the core 40 in the first panel 26 by attaching means 66. In the preferred embodiment, the top 62 of the second panel 28 has VELCRO patches 74 and the upper-most individual panel 52a of the core 40 has complementary VELCRO patches 76 for attachment thereto. Patches of VELCRO may be used as illustrated in the Drawings or a strip of VELCRO may be used. Velcro is advantageous to use since it can be attached and detached multiple times while holding the panels 26, 28 securely together. It is to be understood that other forms of attaching means may be used without departing from the scope of the invention.

Another feature of note is that the bulkhead void filler 20 may have a connecting means 78 that also serves the function of a spread-limiter. The connecting means or spread-limiter 78 is a sheet attached to the overlapping or first end 46 of the outer face sheet 38 of each of the rigid panels 26, 28 at a small distance above the bottom end 80 of each rigid panel 26, 28. The connecting means or spread-limiter 78 is attached to the overlapping portion 46 of the outer face sheets 38 by suitable means, such as adhesive, and is made of a suitable material having high strength, such as Kraft paper.

The connector means or spread-limiter 78 serves two functions. First, when the rigid panels 26, 28 are in the disassembled condition, as shown in FIGS. 2 and 4, the connecting means 78 keeps the panels 26, 28 in matched pairs. In this condition, the connector means 78 is collapsed along a fold line 82 and the rigid panels 26, 28 may be placed in a generally flat, side-by-side configuration, as shown in FIG. 2. This configuration allows for easier shipment and storage of the bulkhead void filler 20 since it can be folded up in a compact manner.

Second, when the rigid panels 26, 28 are in the assembled condition, as shown in FIGS. 3 and 4, the spread-limiter 78 defines the maximum distance the bottom ends 80 of the rigid panels 26, 28 may be apart and prevents the rigid panels 26, 28 from spreading any greater distance. When assembled, the bottom ends 80 of the rigid panels 26, 28 are spread apart approximately the length of the spread-limiter 78. Preferably, the rigid panels 26, 28 are only allowed to spread 45" to 46" when used with a 92" or 96" inch wide trailer cargo area and in the preferred embodiment, the spread-limiter 78 allows the panels 26, 28 to spread apart a distance of 46" when used with a 92" or 96" inch wide trailer cargo area.

While a preferred embodiment of the present invention is shown and described, it is envisioned that those skilled in the art may devise various modifications of the present invention without departing from the spirit and scope of the appended claims. The invention is not intended to be limited by the foregoing disclosure.

The invention claimed is:

1. A bulkhead void filler for use in a cargo area, comprising:
   first and second rigid panels, each having an upper end and a lower end;
   said first and second rigid panels, each having first and second face sheets a reinforcing and strengthening core, interposed therebetween;
   a first fastening means operatively connected to said lower ends of said first and second rigid panels for permitting said first and second rigid panels to be selectively disposed in either a first erected operative mode or a second collapsed inoperative mode with respect to each other; and
   a second fastening means operatively associated with said upper ends of said first and second rigid panels for non-pivotably connecting said first and second rigid panels together when said first and second rigid panels are selectively disposed in said first erected operative mode, and for permitting said first and second rigid panels to be selectively disposed in said second collapsed inoperative mode when said second fastening means is not connected between said first and second rigid panels.

2. A bulkhead void filler as defined in claim 1, wherein said second fastening means and at least one of the panels includes an attachment means thereon for matingly engaging said second fastening means and said on of the panels.

3. A bulkhead void filler as defined in claim 2, wherein said second fastening means and said at least one panel are disengagable.

4. A bulkhead void filler as defined in claim 1, wherein said second fastening means includes a flap formed from a portion of the upper end of the first panel for overlapping the upper end of said second panel.

5. A bulkhead void filler as defined in claim 4, wherein said second fastening means and said second panel includes an attachment means thereon for matingly engaging said second fastening means and the second panel.

6. A bulkhead void filler as defined in claim 5, wherein said second fastening means and said second panel are disengagable.

7. A bulkhead void filler as defined in claim 5, wherein said attachment means is Velcro.

8. A bulkhead void filler as defined in claim 4, wherein each of said cores is corrugated and attached to the respective sheets along substantially all of the ridges.

9. A bulkhead void filler as defined in claim 8, wherein an upper end of said second panel abuts and fits snugly against an upper portion of said corrugated core.

10. A bulkhead void filler as defined in claim 9, wherein said upper end of said second panel is attached to said upper portion of said corrugated core by Velcro.

11. A bulkhead void filler as defined in claim 4, wherein each of said cores is comprised of a plurality of M-shaped braces.

12. A bulkhead void filler as defined in claim 11, wherein each M-shaped brace is comprised of a plurality of V-shaped sheets attached to each other.

13. A bulkhead void filler as defined in claim 11, wherein the M-shaped braces are spaced apart from each other.

14. A bulkhead void filler as defined in claim 11, wherein an upper end of said second panel abuts and fits snugly against an upper portion of said core.

15. A bulkhead void filler as defined in claim 14, wherein said upper end of said second panel is attached to said upper portion of said core by Velcro.

16. A bulkhead void filler as defined in claim 1, wherein said first fastening means comprises a spread limiting means attached to said lower end of each panel for limiting the distance the panels can be spread.

17. A bulkhead void filler as defined in claim 16, wherein said spread limiting means is attached to each of said first sheets.

18. A bulkhead void filler as defined in claim 1, wherein the lower ends of said panels are separated a distance of 45" to 46" when said panels are non-pivotably engaged.

19. A bulkhead void filler as defined in claim 1, wherein the bottom ends of said panels are separated a distance of 46" when said panels are non-pivotably engaged.

20. A bulkhead void filler for use in a cargo area, comprising:
   first and second rigid panels, each panel having a core, and an upper and lower end;
   a first fastening means operatively connected to said lower ends of said first and second rigid panels for permitting said first and second rigid panels to be selectively disposed in either a first erected operative mode or a second collapsed inoperative mode with respect to each other; and a second fastening means, engageable and disengageable between said upper ends of said first and second rigid panels, for non-pivotably connecting said first and second rigid panels together in said first erected operative mode when said second fastening means is engaged between said first and second panels, and for permitting said first and second rigid panels to be selectively disposed in said second collapsed inoperative mode when said second fastening means is disengaged between said first and second rigid panels.

21. A bulkhead void filler as defined in claim 20, wherein said second fastening means and at least one of the panels includes an attachment means thereon for matingly engaging said second fastening means and said one of the panels.

22. A bulkhead void filler for use in a cargo area, comprising:

first and second panels, each having an upper end and a lower end;

said first and second panels including mating panel sections adjacent said upper end portions thereof for positioning and maintaining said first and second panels at a predetermined angle with respect to each other;

first fastening means operatively connected to said lower ends of said first and second panels for permitting said first and second panels to be selectively disposed in either a first erected operative mode or a second collapsed inoperative mode with respect to each other; and second fastening means comprising complimentary releasable attaching elements disposed upon said upper end portions of said first and second panels for releasably securing said mating panels sections in assembled relationship with respect to each other for preventing relative pivotal movement between said first and second panels when said first and second panels are selectively disposed in said first erected operative mode as a result of said second fastening means being attached between said first and second panels, and for permitting said first and second panels to be selectively disposed in said second collapsed inoperative mode when said second fastening means is detached between said first and second panels.

* * * * *